INVENTORS
PETER H. VALENTYNE
CHESTER A. SUNDBOM
BY
Fearman & Fearman.
ATTORNEYS

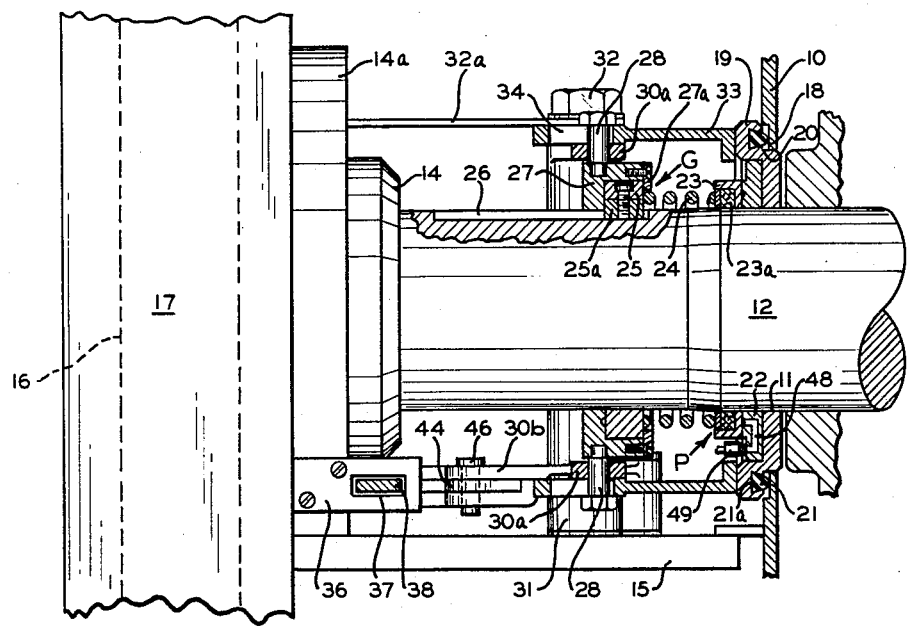

INVENTORS
PETER H. VALENTYNE
CHESTER A. SUNDBOM
BY
*Fearman + Fearman*
ATTORNEYS

United States Patent Office 2,963,308
Patented Dec. 6, 1960

2,963,308

SANITARY GLANDS

Peter H. Valentyne and Chester A. Sundbom, Saginaw, Mich., assignors to Baker Perkins Inc., Saginaw, Mich., a corporation of New York Filed May 16, 1955, Ser. No. 508,348

10 Claims. (Cl. 286—11.13)

This invention relates to sanitary glands or seals for dough mixers of the type which may be readily withdrawn from the mixer wall to permit the interior of the mixer and particularly the portion of the agitator shaft which is adjacent the mixer wall to be thoroughly cleaned.

As is well known in the art, designers of dough mixers and the like have long sought a machine which could be so easily dismantled for cleaning that the machine operator would thoroughly clean the equipment at regular intervals instead of perfunctorily cleaning the readily accessible parts while neglecting those elements which are difficult to reach. We have particular reference to the spaces or pockets between the shaft glands and ends of the agitator blade hubs where old dough tends to accumulate and ferment if the machine is not properly cleaned. Rigid sanitary codes have required that bakery operators enforce a thorough periodic cleaning of all parts of a mixer which are exposed to the dough, however it has been difficult to check to see if certain parts of older type mixers have in fact been properly cleaned. While glands which may be actuated bodily along the agitator shaft from positions in which the openings in the mixer end walls are sealed to positions in which the glands are sufficiently remote from the openings to permit cleaning of the elements have been proposed, such glands and the means for actuating them have been relatively complex in nature and have required extensive alteration of the design of known machines. Further, inasmuch as the dough in the machines tends to harden around the glands and considerable force must be employed to secure the glands in sealing relation, it has been thought that it was necessary to employ hydraulic pressure or the like to operate the glands with any degree of ease.

One of the prime objects of the instant invention is to design a manually operable gland of simple and inexpensive construction which effectively seals a dough mixer against any leakage along the agitator shaft in one position and can be very easily withdrawn to another position in which it frees previously relatively inaccessible parts of the mixer to cleaning and inspection.

A further object of the invention is to provide a manually operable gland for dough mixers such as described in which the gland may be moved into sealing relation with the exertion of relatively little force and may be securely locked in position with the same motion.

A further object of the invention is to design a gland for dough mixers in which unlocking of the gland is accomplished with the same motion as withdrawal of the gland and lost motion means is employed in the mechanism for withdrawing the gland so that an initial impact is applied to jar the seal outwardly and break up any hardened dough which has formed around the agitator shaft and tends to cement the gland in position.

Another object of the invention is to provide means for operating a gland such as described which is conveniently accessible to the operator and operates within the relatively confined space allowed so that no major changes in the design of existing machines need be made in order to install the glands and operating mechanism.

A further object of the invention is to design a gland in which an automatic axial adjustment is made for wear of the relatively rotatable elements and which may be actuated into and out of sealing position without the use of tools of any kind.

A still further object of the invention is to design a gland for dough mixers which is of simple and practical construction and has relatively few component parts, which is easy to withdraw and replace yet is efficient and reliable in operation, which is convenient to assemble and disassemble when necessary for adjustment or renewal of parts, and which can be very economically manufactured and sold at practical prices.

With the above and other objects in view, the present invention consists in the combination and arrangement of parts hereinafter more fully described, illustrated in the accompanying drawings, and more particularly pointed out in the appended claims, it being understood that equivalent changes may be made in the various elements which comprise the invention without departing from the spirit thereof or the scope of the appended claims.

In the drawings:

Fig. 1 is a fragmentary front elevational view partly in vertical section of a dough mixer showing the gland locked in sealing position against the mixer tank wall.

Fig. 2 is a transverse sectional view taken on the line 2—2 of Fig. 3.

Figure 3:
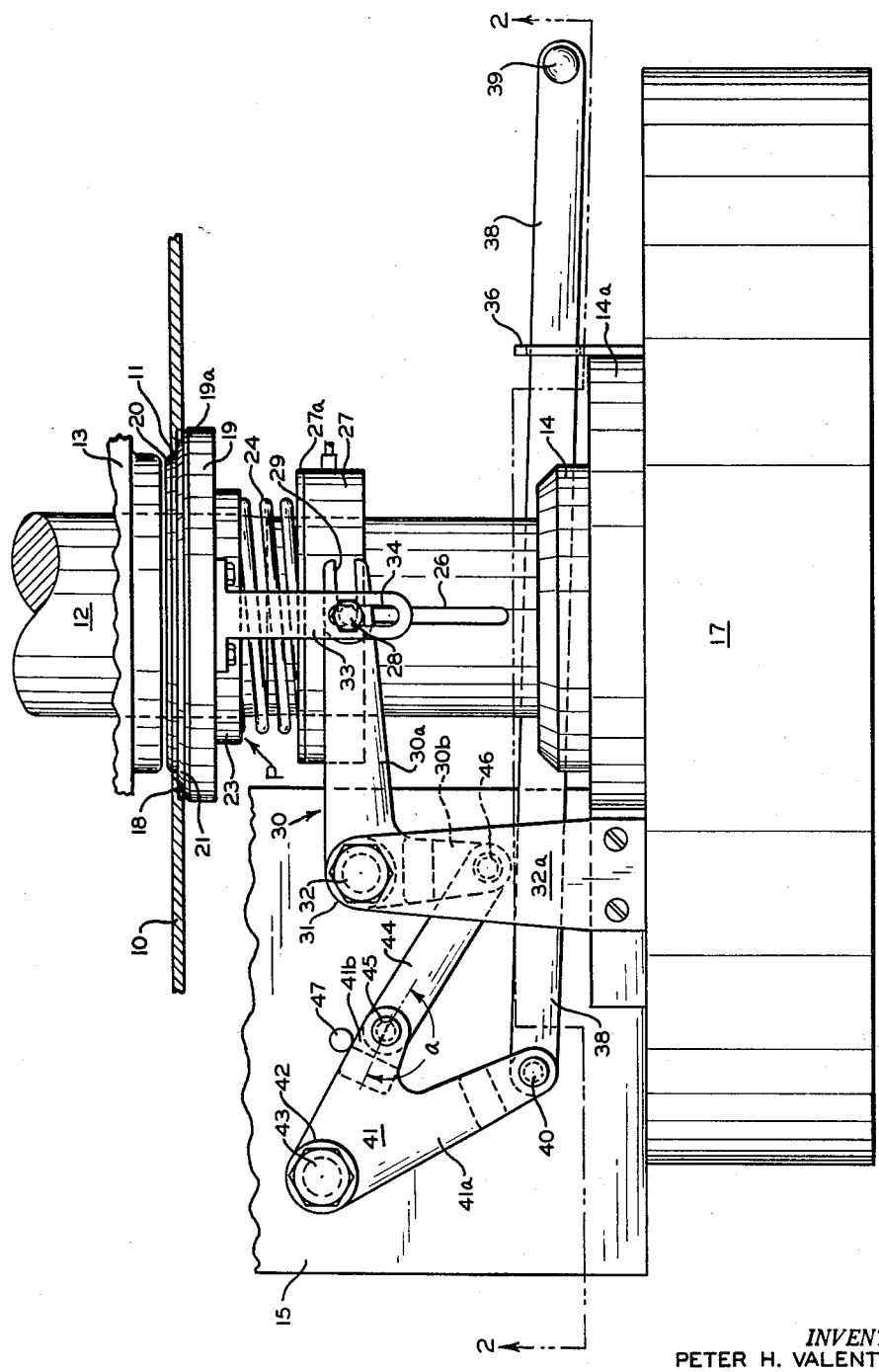
Fig. 3 is a top plan view of the apparatus shown in Fig. 1 with the gland locked similarly in sealing relation.

Referring now more particularly to the accompanying drawings in which we have shown a preferred embodiment of the invention, a numeral 10 generally indicates the end wall of a mixer dough tank which is provided with an opening 11 to admit the agitator shaft 12 in the usual manner. The shaft 12 which has the hubs 13 of suitable agitator members rigidly secured thereon is journaled in bearings 14 supported on the frame 15 on both sides of the dough tank 10 and a sprocket or gear or the like 16 is provided on the one end of the shaft 12 for diving the same, the gear or similar driving member 16 in the instant drawing being shown as enclosed by a housing 17.

To prevent leakage out along the rotary shaft 12 the removable gland G is provided to seal off the openings 11 in both ends of the dough tank. It will be seen that the end wall 10 of the mixing tank is spotfaced as at 18 around the opening 11 in Fig. 1 to accommodate a non-rotating annular gland plate 19 which is shouldered as at 20 so that it fits into the opening 11. A neoprene sealing gasket 21 fixed in an opening 21a in the plate 19 bears against the spotfaced portion 18 of the wall 10 and the inner edge of the plate 19 is beveled as at 19a so as to be receivable within the spotfaced recess 18 as shown.

Bearing against a gland ring 22, which is fixed in the plate 19, to retain the plate 19 in sealing engagement is a rotary seal purchase P which includes a front ring 23, with a gasket 23a, and a spring 24 under compression. A collar 25 with a key 25a slidable in a keyway 26 provided in the shaft 12 and therefore also rotatable with the shaft 12 forms the other end of the purchase and retains the spring 24.

The collar 25 is rotatable in a yoke ring 27 which includes a front retaining plate 27a. Fixed to the upper and lower peripheral surfaces of the ring 27 are oppositely disposed bolts or pins 28 which are received within slots 29 in the yoke arms 30a of a bell crank yoke lever 30. The lever 30 which includes a bearing 31 pivotal on a trunnion or yoke pin 32 is actuated in a manner which will now be explained to move the pins 28 and thereby the gland inwardly into sealing position and outwardly to a withdrawn position as desired. The upper end of the trunnion 32 may be braced by a support bar 32a extending from the bearing block 14a as shown. A pair of straps 33 extending outwardly from the plate 19 have elongated slots 34 therein through which the pins 28 extend and plainly this is a lost motion connection whereby the pins will on the withdrawal stroke have a certain movement relative to the plate 19 which permits the pins to build up momentum so that when the pins contact the outer end walls of the slots 34 with considerable impact the seal will be jarred loose from the tank end wall 10.

Mounted on the bearing post 14a is a control bar guide 36 which has a slot 37 provided therein. The transversely disposed control bar 38 which has a handle 39 on the front end thereof extends through the slot 37 as shown and is pivotally connected at its rear end as at 40 to the bifurcated arm 41a of a control quadrant member or bell crank 41. The member 41 has also a bearing 42 which is pivotal on a trunnion or yoke pin 43. When the gland is in withdrawn or "out" position a toggle link 44 which is pivotally received in the other bifurcated arm 41b of the member 41 as at 45 and in the arm 30b of the lever 30 as at 46 is nearly in parallelism with the control bar 38. The linkage is so arranged that the gland is moved into sealing relation when the yoke lever 30 has been swung to the position in which it is shown in Fig. 3. Just prior to reaching this position the link 44 was in alignment with the arm 41b of the member 41, and the imaginary line connecting the pivots 43, 45 and 46. When the bar 33 was moved further forwardly to pivot the member 41 further in a counter-clockwise direction (in Fig. 3), the link 44 was swung past center (note the angle a in Fig. 3) and the mechanism thus was locked in position. A pin 47 fixed in the frame or table 15 limits the pivot of the member 41 so that the link 44 is not swung sufficiently past center to move the member 30 and disturb the sealed position of the gland.

The rotary and stationary elements of the glands are so arranged that grease employed to lubricate the relatively rotatable parts cannot enter the mixing tank. In Fig. 1 note the grease passage 48 in the ring 22 leading to the face of the rotating ring 23 from the fitting 49 and in Fig. 2 note grease passage 50 in the ring 27 leading to the collar 25 from the fitting 51.

Figure 4:
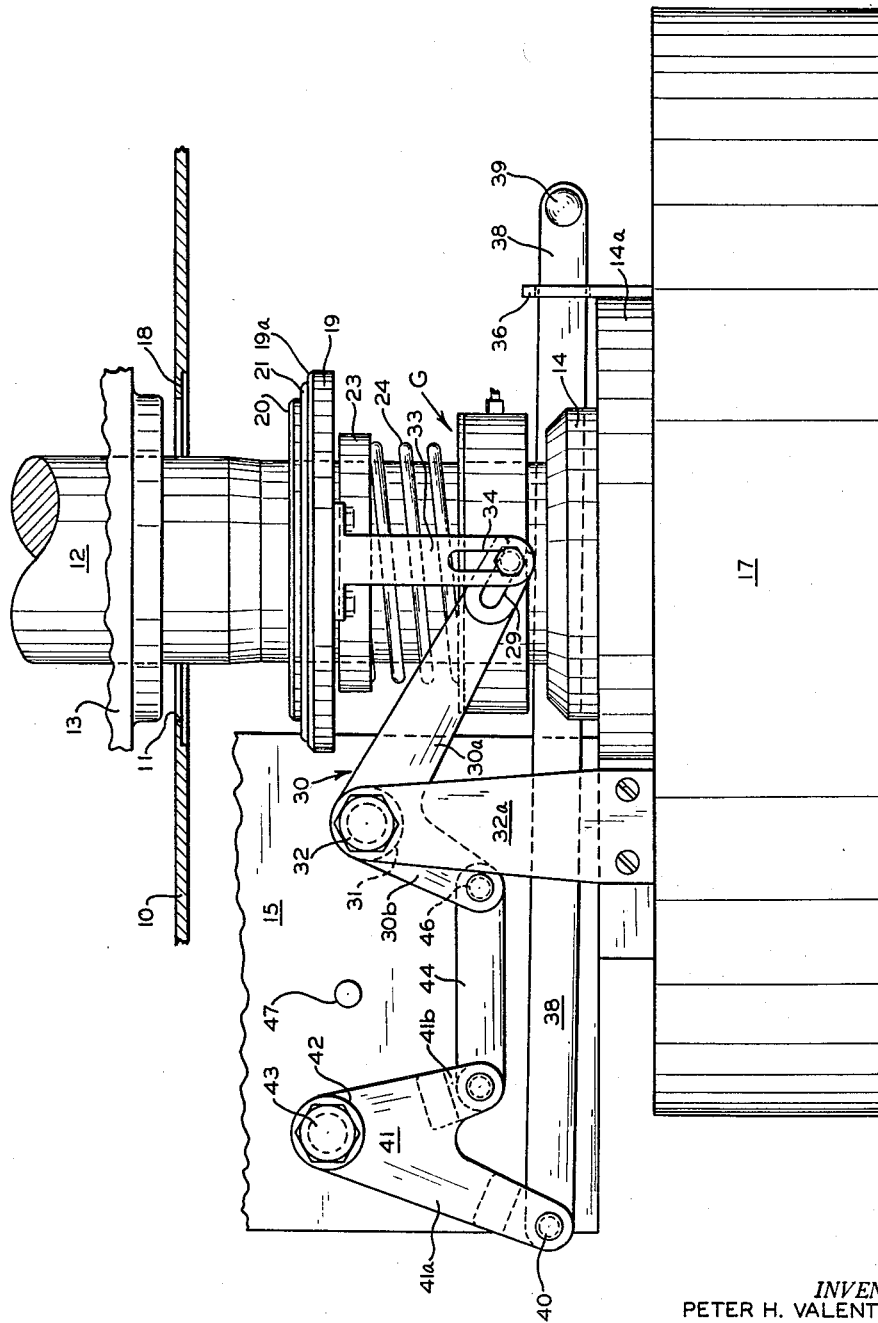
Fig. 4 is a similar top plan view, the gland being withdrawn from the mixer wall to a position in which previously relatively inaccesible parts of the mixer may be easily cleaned.

In operation, if the gland is locked in sealing position as in Figs. 1 and 3, and it is desired to remove the gland to the position in which it is shown in Fig. 4, the operator standing in front of the machine need only grasp the handle and push the control bar 38 inwardly. When the link 44 has been moved outwardly past the center position in which it is in alignment with the arm 41b from the position (Fig. 4) in which it locks the linkage, the spring 24 will tend to aid the operator in actuating the linkage. As has been noted the pins 28 will move in the slots 34 and when they engage the end walls of the slots will do so with some force so that the plate 19 is jarred from the opening 11 breaking any hardened crust of dough which tends to cement it in position. Once the pins 28 contact the outer ends of the slots 34, the gland G will be slid rearwardly as a unit, the collar 25 continuing to move rearwardly in the keyway 26.

After the elements adjacnt the opening 11 have been thoroughly cleaned and inspected, the operator can restore the gland to sealing position by simply pulling the control bar 38 outwardly, and it will be apparent that by pulling the bar outwardly far enough the gland is locked in position when the link 44 is moved past center.

Since the mechanical advantage obtained through the linkage is relatively great, and the spring 24 does not have to be restored at the same time as the gland G must be moved bodily inwardly, the gland may be restored to sealing position without undue exertion.

While for convenience sake we have described only the operation of the gland shown in the drawings, it should be understood that a gland identical to the gland shown, and withdrawn and restored in exactly the same manner, is employed at the opposite end of the mixing tank to seal the other opening 11.

It should be obvious that we have perfected a gland of greatly improved construction which is characterized by the ease with which it may be moved into and out of sealing position. It is to be understood that various changes may be made in the various elements which comprise the invention without departing from the spirit thereof or the scope of the appended claims, and in all cases the foregoing descriptive text and drawings are to be considered as merely illustrating the invention rather than as in any way limiting the scope thereof.

We claim:

1. For use with a materials treating or like machine which includes a chamber and a rotatable shaft extending through an opening in an end wall of the chamber: a shaft gland adapted for axial movement on said shaft into sealing relation with said end wall adjacent said opening and for retracting from said position, said gland comprising, a gland plate adapted to engage said wall, a collar mounted to rotate with the shaft, a ring on said shaft engaging said plate, a spring under compression between said collar and ring urging said plate toward the said wall of the chamber, means mounted on said collar for relative rotation therewith, means connecting said latter means and said plate permitting a limited movement of said latter means prior to connecting them for movement as a unit, and means connected to said means on the collar operable to move said gland as a unit axially on said shaft.

2. The combination defined in claim 4 in which said means connecting the gland plate and bearing means comprises a strap with an elongated slot therein, a pin on said bearing means extending through the slot, and lever means connected to said pin operable to move the gland as a unit axially on the shaft.

3. The combination defined in claim 2 in which said pin and slot comprises a lost motion connection which permits said spring to move said bearing means outwardly relative to said gland plate for a limited distance to assist the lever action prior to the time the lever means can retract the gland as a unit.

4. For use with a machine which includes a chamber wall and a rotatable shaft extending through an opening therein: a gland movable axially inwardly on said shaft into sealing relation with said wall adjacent said opening and retractable from said position, said gland comprising, a gland plate adapted to engage said wall, a member on said shaft rotatable therewith outward of said plate, a second member on said shaft outward of said latter member and rotatable therewith, a spring under compression interposed between said members and exerting a pressure in a direction to urge said first member inwardly and said gland plate into engagement with said wall, bearing means mounted on said second member permitting said second member to revolve with respect thereto, means attached to said bearing means for moving the same outwardly from said wall, and means connecting the bearing means and gland plate permitting a limited retraction of said bearing means relative to said plate so that said bearing means initially engages said connecting means with some impact to jar the gland plate out of sealing relation.

5. For use with a machine which includes a chamber and a shaft extending through an opening in a wall of the chamber: a gland movable axially on said shaft inward into sealing relation with said opening and retractable from said position, said gland comprising an inner gland plate adapted to engage the wall, an outer gland element, members rotating with said shaft on said gland plate and element, spring means interposed between said latter members exerting a force of predetermined intensity against the rotatable member on said gland plate to urge the plate against the wall, means connecting said gland element and gland plate permitting a predetermined outward movement of said element relative to the plate and expansion of said spring means, and a link system connected to said gland element movable in a predetermined path to first move said gland element outwardly and thence said gland outwardly as a unit, said link system being operative to return said gland as a unit and said gland element relative to the gland plate and including associated means for automatically terminating return of the gland element at a predetermined location in the return path of travel of the system so that said spring is automatically returned to a condition in which it exerts the same force on said gland plate.

6. For use with a machine which includes a chamber and a shaft extending through an opening in a wall of the chamber: a gland movable axially relative to said shaft inward into sealing relation with said opening and retractable from said position, spring means bearing against the gland to force it into engagement with the wall exerting a force of predetermined intensity thereon, and a link system comprising plural elements, connected to said gland and movable in a predetermined path to relieve the pressure of said spring means on said gland, said system including associated means automatically limiting return of said spring means to original condition during travel of said linkage in a return path and locking said spring means in said condition without varying the pressure the spring means exerts.

7. For use with a machine which includes a chamber wall and a shaft extending into an opening in a wall of the chamber: a gland assembly including a gland movable on said shaft into sealing relation with said wall and retractable from said position, said gland assembly including a spring support on said shaft movable axially relative to said gland, means connected to said gland assembly for moving it to and fro, and spring means biased to bear against the gland to force it into engagement with the wall assisting in the movement of said spring support outwardly relative to said gland.

8. A gland construction for selectively sealing and unsealing an opening in a wall or the like through which a shaft extends, said gland construction comprising gland means movable axially of said shaft into and out of sealing engagement with said wall adjacent to said opening; and means for moving said gland means out of said sealing engagement, said moving means including a first part mounted for movement relative to and generally axially of said shaft, and a second part spaced from said first part when said gland means is in sealing engagement and supported by said gland means in a position to be engaged by said first part upon movement of the latter relative to said shaft towards said second part, the spacing of said parts being such as to enable said second part to acquire momentum and jar said gland means out of sealing engagement with said wall.

9. A gland construction for selectively sealing and unsealing an opening in a wall or the like through which a shaft extends, said gland construction comprising gland means movable axially along said shaft; and linkage means connected to said gland means for effecting movements of the latter axially of said shaft into and out of sealing engagement with said wall adjacent to said opening, said linkage means including an exposed operating member reciprocable along a path transversely of the axis of said shaft, and rockable means interconnecting said operating member and said gland means, said rockable means including first rotatable means connected to said operating member, second rotatable means connected to said gland means and motion transmitting means interconnecting said first and second rotatable means and operable to transmit rotation of one rotatable means to the other.

10. A gland adapted to be moved axially on a longitudinally disposed shaft into sealing relation with a wall through which said shaft extends comprising a gland unit, mechanical advantage producing linkage connected to said unit to move the same axially to and fro on the shaft, guide means including a guide extending substantially transversely to said shaft, and a substantially reciprocable control bar having a handle portion thereon received by said guide guided in a transversely disposed path by said guide for actuating said linkage to move the gland, said linkage comprising a pair of bell crank levers pivotally connected to one another by a link pivotally connected to each of said levers and which may be moved into a position in which it locks the linkage.

References Cited in the file of this patent

UNITED STATES PATENTS

| | | |
|---|---|---|
| 1,649,472 | Hollander | Nov. 15, 1927 |
| 1,796,763 | Patterson | Mar. 17, 1931 |
| 1,947,017 | McHugh | Feb. 13, 1934 |
| 2,285,007 | Brennan et al. | June 2, 1942 |
| 2,638,364 | Rechtin | May 12, 1953 |
| 2,759,369 | Ginocchio et al. | Aug. 21, 1956 |